Patented June 28, 1949

2,474,588

UNITED STATES PATENT OFFICE 2,474,588

ALCOHOL PROCESS

Charles E. Morrell, Westfield, and Richard F. Robey, Cranford, N. J., assignors, by mesne assignments, to Standard Oil Development Company, a corporation of Delaware No Drawing. Application December 31, 1945, Serial No. 638,588

7 Claims. (Cl. 260—639)

This invention relates to improvements in the production of alcohols, and more particularly to an improved process for the production of ethyl alcohol. Processes for the conversion of ethylene, generally supplied as gaseous mixtures of hydrogen, methane, ethane and varying amounts of ethylene, to ethyl alcohol using sulfuric acid or other mineral acids, are known. In such processes, using sulfuric acid as an illustration, the gaseous mixtures containing ethylene are contacted with the sulfuric acid, generally countercurrently in an absorption tower, forming ethyl sulfate and certain amounts of diethyl sulfate as a result of the reaction between ethylene and sulfuric acid. The reaction product, consisting chiefly of ethyl sulfate, diethyl sulfate and unreacted sulfuric acid, commonly designated as extracts, is then diluted with water and heated to hydrolyze the ethyl and diethyl sulfates to ethyl alcohol which is recovered by distillation. On the basis of gallons of alcohol produced per gallon of acid used, prior art processes are inefficient principally due to the fact that with customary equipment and methods acid saturation is low. This is to say, the mols of ethylene per mol of acid in the extract rarely exceeds 1.2 to 1.3, which is only 60-65% of the theoretical amount of ethylene reactable with $H_2SO_4$.

The principal object of the present invention is the development of a process which will increase the concentration of ethylene in an acid extract on a mol per mol basis. This and other objects will be apparent to those skilled in the art upon reading the following description.

It has now been found that if an acid extract containing up to 1.3 mols of ethylene per mol of acid is held at the temperature and pressure maintained in the absorption tower, in contact with an ethylene-rich gas for a period of 1-3 hours, the mols of ethylene per mols of acid in the acid extract can be increased to 1.5 or more.

In the process of this invention ethylene is fed into an absorber in the form of a gas consisting of from 30-40% of ethylene and the remainder hydrogen, methane and ethane, where it passes upwardly through the absorber countercurrently to a stream of sulfuric acid which is fed into the top of the absorber as 95-100% acid on a hydrocarbon-free basis. The sulfuric acid reacts with the ethylene and is removed from the bottom of the absorber as an acid extract containing 1.2-1.3 mols of absorbed ethylene per mol of sulfuric acid. Due to the fact that strong sulfuric acid of the concentration entering the top of the absorber, is highly corrosive, whereas a partially saturated extract containing about .8 mol of ethylene per mol of sulfuric acid is relatively non-corrosive, a portion of the extract from about midway of the absorber is circulated to the top of the absorber to counteract the corrosiveness of the fresh acid fed into the absorber at that point. Conditions within the absorber are maintained within the range of 60°-100° C. and 300–500 pounds gauge pressure. Due to the heat of reaction between the ethylene and the acid, it will usually not be necessary to pre-heat the gas before entering the absorber. The absorber may be provided with cooling coils in order to maintain the temperature of the acid within the desired range. Fresh acid is fed into the top of the absorber at a rate sufficient to off-set the extract removed from the system.

Extract containing about 1.3 mols of ethylene per mol of sulfuric acid is then removed from the bottom of the absorber and conducted to a tank designated as a soaking drum of sufficient capacity to provide a residence time for the extract of from 1-3 hours. The soaking drum is maintained at the same or higher temperature and pressure conditions as those used in the absorber. Ethylene in the form of a hydrocarbon gas containing 65-80% of ethylene is continuously fed into the bottom of the soaking drum so that it bubbles through the extract. The extract is thus in constant contact with ethylene-rich gas during the whole of its residence time within the soaking drum. Unreacted ethylene from the soaking drum is fed into the bottom of the above-mentioned absorber. After a residence time of from 1-3 hours, preferably about 2 hours, in the soaking drum, the extract enriched to about 1.5 mols of ethylene per mol of acid is removed from the soaking drum and fed to a converter where it is hydrolyzed to alcohol and the alcohol recovered in the usual manner.

Petroleum oil refinery gases from which hydrocarbons of higher molecular weight than ethane and ethylene have been removed, will provide the most available source for ethylene although it is contemplated using ethylene-containing gases produced in any other manner. In accordance with present day practices, the removal of hydrocarbons above $C_2$ from refinery gases leaves a gas containing 30-40% of ethylene, which is used according to the present invention as the principal feed gas to the absorber. By means of very close fractionation, the ethylene content in refinery gases can be increased to 60-100%. Gases containing from 60-100% ethylene may then be used as feed to the soaking drum. The ethylene-rich gases are fed to the soaking drum at a rate sufficient to maintain the extract physically saturated with ethylene. For the purpose of demonstrating the effect on physically dissolved ethylene achieved by soaking the extract from the absorber, the following series of tests were run. Samples were taken from the bottom plate of the absorber on different days and their saturation determined by analysis. The extract was then circulated to the soaking drum which was maintained at the operating conditions of the absorber, namely 80° C. and 300 pounds gauge pressure, where the extract was held for a residence time of 2–3 hours. After the prescribed residence time had elapsed, the extracts were again sampled and saturation determined by analysis. The results of these tests are shown in the following table.

| Run No. | 1 | 2 | 3 | 4 |
|---|---|---|---|---|
| Bottom Plate Saturation | 1.21 | 1.27 | 1.26 | 1.26 |
| Soaking Drum Saturation | 1.27 | 1.30 | 1.32 | 1.28 |

The foregoing increase in saturation illustrates the chemical reaction which takes place between the physically dissolved ethylene and the acid in the soaking drum.

In spite of all the precautionary measures taken to eliminate the higher olefins from petroleum oil refinery ethylene gas, a certain small percentage of propylene will usually remain. Often as much as 2% of the total olefin in an ethylene gas will be present as propylene. Since propylene is converted to alcohol in the same manner as ethylene, any propylene present in the feed gas will be found in the ethyl alcohol as isopropanol. For certain purposes, isopropyl alcohol concentrations of 0.5% in ethyl alcohol are permissible. However, it is preferred to hold isopropyl alcohol concentrations at less than 0.1%. The practice of the present invention eliminates isopropyl alcohol as a contaminant in ethyl alcohol produced from refinery gases. An extract containing 1.3 mols of ethylene per mol of 98% $H_2SO_4$ on a hydrocarbon-free basis and propylene equivalent to 2 weight per cent of the ethylene was divided into equal parts. One part was held at 80° C. and 300 pounds gauge pressure for 3 hours, after which it was diluted with water, hydrolyzed and the alcohol recovered by distillation. The alcohol thus obtained contained no appreciable amount of isopropyl alcohol. The second part was maintained at atmospheric conditions for 3 hours, then diluted with water, hydrolyzed and the alcohol recovered by distillation. The alcohol thus produced contained 0.2 weight per cent of isopropyl alcohol based on the ethyl alcohol formed by hydrolysis of the extract.

The following table shows the results obtained from several runs made in accordance with the present invention and under the conditions indicated.

| Acid Strength, Wt. Per Cent $H_2SO_4$ | Temperature, ° C. | Ethylene Partial Pressure, P. s. i. g. | Extract Satn., $C_2H_4/H_2SO_4$ | | Time, Hours |
|---|---|---|---|---|---|
| | | | Init. | Final | |
| 98 | 80 | 190 | 1.30 | 1.49 | 2 |
| 96 | 80 | 190 | 1.30 | 1.39 | 2 |
| 95 | 80 | 150 | 1.20 | 1.28 | 2 |
| 98 | 80 | 380 | 1.30 | 1.53 | 1 |
| 96 | 80 | 95 | 1.30 | 1.47 | 2 |
| 95 | 80 | 500 | 1.30 | 1.38 | 2 |
| 98 | 50 | 190 | 1.20 | 1.25 | 2 |
| 98 | 90–100 | 190 | 1.30 | 1.53 | 2 |

What is claimed is:

1. An improved method of manufacturing ethyl alcohol which comprises contacting a hydrocarbon mixture containing ethylene with 95–100% $H_2SO_4$ on a hydrocarbon-free basis, at 60–100° C. and a pressure of 300–500 pounds per square inch gauge to produce an acid extract containing 1.0–1.3 mols of ethylene per mol of $H_2SO_4$, then contacting said extract with a hydrocarbon mixture containing ethylene for 1–3 hours at a temperature of 80–110° C. and a pressure of 300–500 pounds per square inch gauge to produce an extract containing at least 1.4 mols of ethylene per mol of $H_2SO_4$ and hydrolyzing the last named extract with water to produce ethyl alcohol.

2. An improved method of manufacturing ethyl alcohol which comprises contacting a hydrocarbon mixture containing ethylene with 98% $H_2SO_4$ on a hydrocarbon-free basis, at 60–100° C. and a pressure of 300–500 pounds per square inch gauge to produce an acid extract containing 1.0–1.3 mols of ethylene per mol of $H_2SO_4$, then contacting said extract with a hydrocarbon mixture containing ethylene for 1–3 hours at a temperature of 80°–110° C. and a pressure of 300–500 pounds per square inch gauge to produce an extract containing at least 1.4 mols of ethylene per mol of $H_2SO_4$ and hydrolizing the last named extract with water to produce ethyl alcohol.

3. An improved method of manufacturing ethyl alcohol which comprises contacting a hydrocarbon mixture containing at least 30% ethylene with 98% $H_2SO_4$ on a hydrocarbon-free basis, at 60°–100° C. and a pressure of 300–500 pounds gauge to produce an acid extract containing 1.0–1.3 mols of ethylene per mol of $H_2SO_4$; then contacting said extract with a hydrocarbon mixture containing at least 65% ethylene for 1–3 hours at a temperature of 80°–110° C. and a pressure of 300–500 pounds gauge to produce an extract containing at least 1.4 mols of ethylene per mol of $H_2SO_4$ and hydrolizing last named extract with water to produce ethyl alcohol.

4. An improved method of manufacturing ethyl alcohol which comprises contacting a hydrocarbon mixture containing ethylene with 98% $H_2SO_4$ on a hydrocarbon-free basis, at 75°–85° C. and a pressure of 300–500 pounds per square inch gauge to produce an acid extract containing 1.0–1.3 mols of ethylene per mol of $H_2SO_4$; then contacting said extract with a hydrocarbon mixture containing ethylene for 1–3 hours at a temperature of 85–95° C. and a pressure of 300–500 pounds per square inch gauge to produce an extract containing at least 1.4 mols of ethylene per mol of $H_2SO_4$ and hydrolizing last named extract with water to produce ethyl alcohol.

5. An improved method of manufacturing ethyl alcohol which comprises contacting a hydrocarbon mixture containing ethylene contaminated with about 0.1–5% of propylene with 95–100% $H_2SO_4$ on a hydrocarbon-free basis, at 60–100° C. and a pressure of 300–500 pounds per square inch gauge to produce an acid extract containing 1.0–1.3 mols of ethylene per mol of $H_2SO_4$; then contacting said extract with a hydrocarbon mixture containing ethylene for 1–3 hours at a temperature of 80°–110° C. and a pressure of 300–500 pounds per square inch gauge to produce an extract containing at least 1.4 mols of ethylene per mol of $H_2SO_4$ and hydrolizing last named extract with water to produce ethyl alcohol substantially free of isopropyl alcohol.

6. An improved method of manufacturing ethyl alcohol which comprises contacting a hydrocarbon mixture containing ethylene contaminated with about 0.1–5% of propylene with 95–100% $H_2SO_4$ on a hydrocarbon-free basis, at 60–100° C. and a pressure of 300–500 pounds per square inch gauge to produce an acid extract containing 1.0–1.3 mols of ethylene per mol of $H_2SO_4$; then contacting said extract with a hydrocarbon mixture containing ethylene for 1–3 hours at a temperature of 80°–110° C. and a pressure of 300–500 pounds per square inch gauge to produce an extract containing a propylene product not hydrolyzable to isopropyl alcohol and at least 1.4 mols of ethylene per mol of $H_2SO_4$ and hydrolyzing last named extract with water to produce ethyl alcohol substantially free of isopropyl alcohol.

7. An improved method of manufacturing ethyl alcohol which comprises contacting a hydrocarbon mixture containing ethylene with 95–100% $H_2SO_4$ on a hydrocarbon-free basis, at 60–100° C. and a pressure of 300–500 pounds per square inch gauge to produce an acid extract containing 1.0–1.3 mols of ethylene per mol of $H_2SO_4$, separating the acid extract from the hydrocarbon mixture, maintaining the acid extract for 1 to 3 hours at a temperature of 80° C. to 110° C., and a pressure of 300 to 500 pounds per square inch gauge and then hydrolyzing the extract with water to produce ethyl alcohol.

CHARLES E. MORRELL.
RICHARD F. ROBEY.

REFERENCES CITED

The following references are of record in the file of this patent:

UNITED STATES PATENTS

| Number | Name | Date |
| --- | --- | --- |
| 1,885,585 | Brooks | Nov. 1, 1932 |
| 2,006,942 | Clark | July 2, 1935 |
| 2,047,194 | Davis | July 14, 1936 |
| 2,190,501 | Brooks | Feb. 13, 1940 |
| 2,365,264 | Groombridge et al. | Dec. 19, 1944 |
| 2,414,737 | Heinrich | Jan. 21, 1947 |
| 2,414,759 | Mottern | Jan. 21, 1947 |